UNITED STATES PATENT OFFICE.

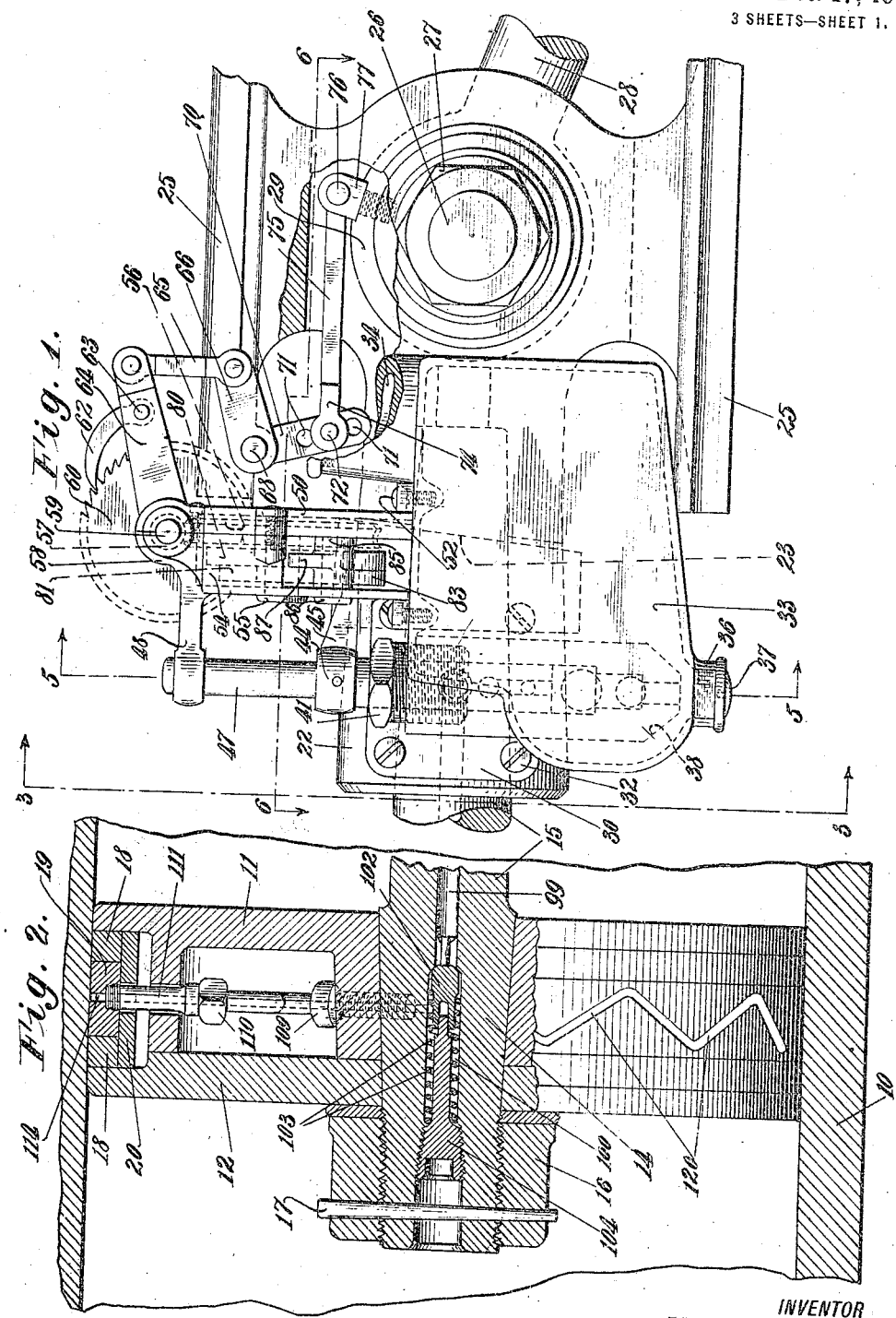

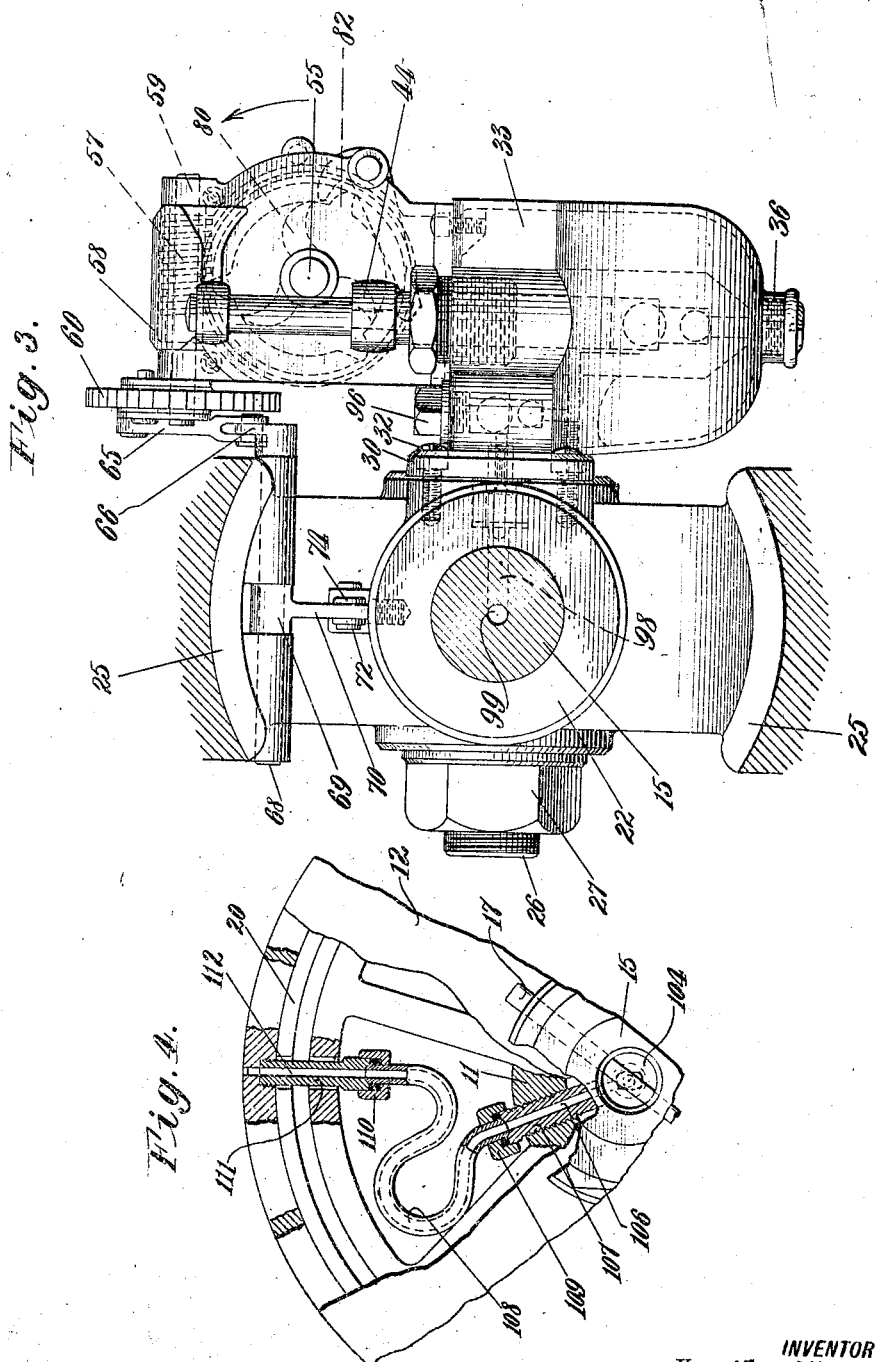

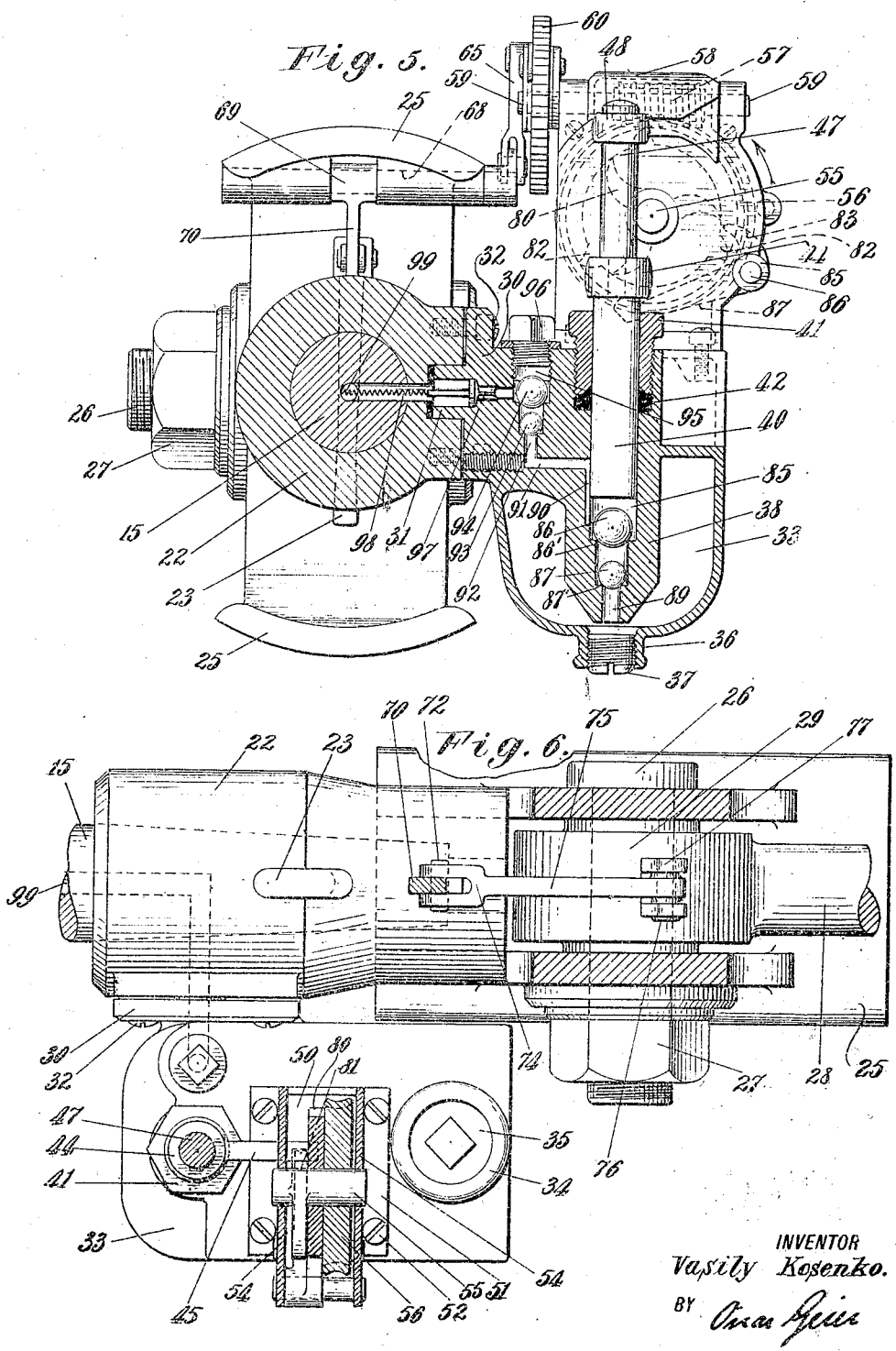

VASILY KOSENKO, OF NEW YORK, N. Y.

ENGINE-LUBRICATING DEVICE.

1,287,701.   Specification of Letters Patent.   Patented Dec. 17, 1918.

Application filed June 8, 1918. Serial No. 238,851.

*To all whom it may concern:*

Be it known that I, VASILY KOSENKO, a citizen of Russia, residing at New York, county of New York, and State of New York, have invented certain new and useful Improvements in Engine-Lubricating Devices, of which the following is a specification.

This invention relates to improvements in devices for lubricating reciprocating engines, and has as its special object the provision of a practical and efficient device whereby the piston of a reciprocating engine may be maintained in a proper lubricated condition when in operation.

A further object is to provide means whereby the quantity of oil or other lubricating materials may be increased or diminished in a convenient manner.

These and other like objects are attained by the novel construction and combination of parts hereinafter described, and shown in the accompanying drawing, forming a material part of this disclosure, and in which:

Figure 1 is a fragmentary side elevational view, showing a conventional type of engine cross-head, and the manner in which the lubricating device is applied.

Fig. 2 is a partial vertical sectional view through the piston of the engine.

Fig. 3 is a vertical sectional view, taken on line 3—3 of Fig. 1.

Fig. 4 is a fragmentary end view of the piston, parts being broken away in order to show the arrangement of lubricating parts therein.

Fig. 5 is a vertical sectional view, taken on line 5—5 of Fig. 1, and,

Fig. 6 is a horizontal sectional view, taken on line 6—6 of Fig. 1.

It is to be understood that throughout the drawing the parts relating specifically to the engine are of conventional type of construction, and of these parts the cylinder is designated by the numeral 10, in which is mounted to operate reciprocatively a piston, comprised of a head 11 and plate 12, containing the usual tapered axial opening, to which is suited the end 14 of the piston rod 15, the same being securely clamped by the nut 16, through which may be passed a securing pin 17.

Engaged within the head 11, and held by the plate 12, are packing rings 18, and a central lubricating ring 19, normally pressed outward by a spring ring 20 as is common.

The opposite end of the piston rod 15 is held in any approved manner within a projection 22, formed with the cross-head by the tapered key 23 in a rigid manner.

The cross-head is comprised of a pair of oppositely disposed curved slide elements 25, adapted to engage with the fixed guides of the engine (not shown), the central portion of the cross-head containing a recess through the side walls of which is entered the wrist-pin 26, held in position by the nut 27, the connecting rod 28 having an enlarged head 29 through which the wrist-pin passes.

Attached to the projection 22, is a bracket 30 having a central projection 31 entering an opening formed in the projection so as to be located thereby, the bracket being held by screws 32 and extending outwardly from the bracket is a casing 33, having at one end a raised hollow projection 34, normally covered by a plug 35, and through which the oil is entered into the casing or reservoir 33.

The casing is further provided at its extreme lower portion with a drain 36 normally plugged by the screw 37. Formed in the opposite end and central of the reservoir 33, is a projection 38, bored to receive a plunger 40, extending inward through the packing screw 41, which compresses the packing 42, the upper end of the plunger being reduced and having fitted upon it a hub 44 from which extends a rigid arm 45, the function of which will be further on described.

The extending end 47 of the plunger is guided in an arm 48, formed with a bracket 50, secured to the top of the cylinder 33, by extending flanges 51 held by the screws 52. This bracket is essentially rectangular and provided with sides 54, in which is journaled a spindle 55, having affixed upon it a worm wheel 56, driven by a worm 57, mounted in a covered casing 58 formed with the bracket 50, from which extends the arm 48, the worm having integrally formed projecting ends 59, journaled in the upper portion of the bracket, one of the ends extending therethrough and having secured upon it a ratchet wheel 60.

Engageable with the teeth of the ratchet wheel 60 is a pawl 62 pivoted on the pin 63 to a lever 64, journaled on the extending end 59 and connecting at its outer end with a lever 65, pivotally engaged with an arm 66, fixed upon a spindle 68, mounted in bearings transversely formed in the crosshead adjacent to the upper sliding element 25.

Rigidly engaged upon the center of the spindle 68 is a hub 69 from which extends an arm 70, having formed through its outer end a plurality of openings 71, receptive of a stud 72 which passes through the fork 74 of a link 75, pivoted at its outer end upon a pin 76, affixed within the slotted head of a stud 77, screw-threaded into the enlarged head 29 of the connecting rod 28.

From the foregoing it will be seen that as the connecting rod, due to its connection with the engine crank, is actuated, motion will be transferred to the lever 64, and, due to the pawl connection with the ratchet wheel, the worm-wheel will be rotated, transmitting motion to the spindle 55 in an obvious manner.

Fixed upon the spindle 55, beside the worm wheel 56, is a star wheel or cam having three contacting elements or arms 80. Also secured upon the spindle 55, adjacent to the star wheel 80, is a raising cam 81, having points 82, the same being adapted to make consecutive contact with a projection 83, formed with the hub 85, pivoted on a pin 86, set in the frame 50, and also formed with the hub 85 is a lever arm 87, extending outward so as to make contact with the fixed arm 45 upon the plunger so that as the projections 82 raise the element 83, the plunger obviously will also be raised due to its engagement with the lever.

This arm is extended into position to make contact with the cams 80 of the star wheel, which obviously forces the plunger 40 downward into the bore 85, pressing the oil contained in the reservoir 33, which has been entered when the plunger was raised, and which is prevented from returning to the reservoir by the valves 86 and 87 which abut against seats 86′ and 87′, formed in the projection 38, which contains an opening 89 into which the oil may enter.

When the plunger descends, the oil held by the upper valve 86 is forced into the recess 90, thence into a channel 91, and its vertical branch 92 against the valves 93 and 94, the latter being engaged in an enlarged recess 95, covered by a cap screw 96. The oil then passes through a passage 97 containing a check valve and communicating with a similar passage 98, formed transversely in the piston rod 15, and communicating with an axial bore 99 extending therethrough.

This bore terminates in an enlarged bore 100 in which is fitted a sliding plug 102, pressed inwardly by a coiled compression spring 103, held in operative position by a plug 104, screw threaded into the extreme outer end of the piston rod 15, so that when a strong current of oil or like lubricant is forced against the plug 102, it is moved from its seat, the oil passing in the annular space between the exterior of the plug and the bore 100 into an opening 106, formed in a plug 107, set transversely within the hub of the piston head 11, and thence through a bent resilient pipe 108, connected with the plug by a union 109, the opposite outer end of the bent pipe 108 communicating through a similar union 110 with a plug 111, containing a passage 112, and communicating with an opening 114 formed in the lubricator ring 19, the exterior of which has peripheral grooves 120 by which the oil is conducted circularly around the piston maintaining it in a desirable lubricated condition.

From the foregoing it is believed to be clearly apparent that when the engine is operating, that, due to the motion transmitted by the connecting rod 28 and the mechanism herein described, the oil is forced under suitable pressure through the piston to its periphery and due to the several openings 71, formed in the arm 70, that a greater or less amount may be transmitted by moving the pin 72 in a manner which will be clearly apparent.

It is also to be noted that due to the resiliency of the bent pipe 108, the packing rings may move limitedly within their grooves, a condition not obtainable if rigid connections were used.

Having thus described my invention what I claim as new, and desire to secure by Letters Patent is:—

1. In a lubricating device for steam engines, the combination with the piston, cross-head and connecting rod thereof, of an oil reservoir carried by said cross-head, a pump operable by the said connecting rod, and connections between said oil reservoir and said piston whereby oil may be forced by said pump outwardly through the walls of said piston.

2. In a lubricating device for steam engines, the combination with the piston, cross-head and connecting rod thereof, of an oil reservoir carried by said cross-head, a pump operable by the said connecting rod, connections between said oil reservoir and said piston whereby oil may be forced by said pump outwardly through the walls of said piston, and means for adjusting the operative connections between said connecting rod and said pump whereby the action of the pump may be controlled.

3. In a lubricating device for engine pistons, the combination with the piston, crosshead and connecting rod thereof, of an annular band set in the periphery of said piston, said band having oil grooves formed upon its periphery, a hollow plug communicating with said band and extending through the walls of said piston, a second hollow plug inserted in the hub of said piston and extending into the rod thereof, a hollow flexible tube connecting between said plugs, and means for forcing a current of oil through said piston rod, said means being actuated by said connecting rod.

4. In an engine piston lubricating device, the combination with the piston rod, cross-head and connecting rod, of an oil reservoir carried by said cross-head, tubular connections extending between said reservoir and through said piston rod, a hollow plug set in the hub of said piston rod in communication with an opening formed axially therethrough, a piston lubricating ring set in a peripheral recess in said piston, a hollow plug screw-threaded therein, a bent flexible tube connecting between said plugs, and means actuated by the motion of said connection rod for forcing oil from said reservoir through said connections.

5. In an engine piston lubricating device, the combination with the piston, a cross-head, connections between said piston and said cross-head and a connecting rod pivotally engaged in said cross-head, of a bell-crank lever pivoted in said cross-head, a plug set in said connecting rod, a link extending from said plug to one of the arms of said bell-crank lever, said bell-crank lever being slotted permitting said link to be engaged in different positions along its length, a lever actuated by said bell-crank lever, a pawl carried thereby, an oil reservoir engaged with said cross-head, a spindle mounted transversely in the frame formed at the upper portion of said oil reservoir, a ratchet wheel on said spindle, the teeth of said pawl engaging with the teeth of said ratchet wheel, a pump operatively combined with said oil reservoir, means actuated by said ratchet wheel for operating said pump, and tubular connections between said pump and said piston whereby a stream of oil may be forced therethrough to the periphery of said piston.

6. In a lubricating device for reciprocating engine pistons, the combination with the piston, a cross-head, a connecting rod connecting therebetween, and a connecting rod pivotally engaged in said cross-head, of an oil reservoir carried by said cross-head, a pump in said oil reservoir, tubular connections between said pump and the exterior of said piston, a bell-crank lever pivoted in said cross-head, means engaged with said connecting rods for operating said bell-crank lever whereby the motion of said bell-crank lever may be controlled, and operative connections between said bell-crank lever and said pump.

In testimony whereof I have affixed my signature.

VASILY KOSENKO.